2,811,572

METHOD FOR MAKING SILVER PEROXIDE ELECTRODES

Adolph Fischbach, Elberon Park, and Achille L. Almerini, West End, N. J., assignors to the United States of America as represented by the Secretary of the Army No Drawing. Application April 1, 1955, Serial No. 498,788

3 Claims. (Cl. 136—34)

(Granted under Title 35, U. S. Code (1952), sec. 266)

The invention described herein may be manufactured and used by or for the Government for governmental purposes without the payment of any royalty thereon.

This invention relates to methods of making electrodes of silver peroxide that are used as depolarizer electrodes usually together with zinc as the negative electrode and with a solution of potassium hydroxide as the electrolyte.

Silver peroxide batteries have found important applications in electronic equipment, guided missiles, etc. due to their large watt output per unit of weight and volume and their nearly constant voltage at very high discharge rates which make such batteries best adapted to continuous high discharge of short duration. Such "one-shot" batteries may be used both as "reserve" and as "non-reserve" type batteries.

If such silver peroxide batteries are used at low discharge rates they show an initially high voltage which may be disadvantageous for some purposes where certain maximum voltages must not be exceeded.

The known thin silver electrodes usually comprise a grid of copper wire screen, silver or nickel plated, of about 50 x 50 mesh. They are conventionally manufactured by a process that includes the steps of making a pasty mixture of silver oxide powder and water, applying this pasty mixture to the grid, drying and heating the resulting plate in a muffle furnace at a temperature of about 500° C. for about ten minutes to reduce the oxide to sintered particles of silver or a mass of finely divided or spongy silver and finally pressing the spongy silver into a coherent layer which is then formed in well known manner to the peroxide state.

It is an object of this invention to improve the manufacturing process of making silver peroxide electrodes by using a solution of a synthetic high polymer such as polystyrene in an organic volatile solvent instead of water in the making of the silver oxide paste. We have found that the plate made with the paste according to the invention requires no sintering at high temperature and no pressing and when electroformed, exhibits excellent electrical properties comparable to, if not better than, those of conventional water pasted plates that have to be sintered and pressed before forming.

The invention will become more apparent from the following description of specific embodiments of the broad inventive idea.

A number of 2½ x 3½" copper screen grids were nickel plated and then pasted with a mixture of 30 gm. of silver monoxide and 0.15 gm. of polystyrene dissolved in 40 cc. of toluene.

Another batch of grids was pasted with a mixture of 30 gm. of silver monoxide and 0.075 gm. of polystyrene in 40 cc. of toluene. In both cases the paste was air dried 45 to 50 minutes prior to pasting and the pasted plates were oven dried about 45 minutes at 130° F. then formed for 17 hours at 0.350 to 0.270 amp. per plate.

The plates were formed in cells using nickel sheets as cathodes and a 5% solution of potassium hydroxide as electrolyte. The average forming current was 0.310 amp. per plate. The formed plates were washed for 15 minutes in running water and then air dried.

In another series the grids were pasted with a mixture consisting of 30 gm. silver monoxide, and 0.075 gm. of polystyrene powder dissolved in 40 cc. of benzene.

In all cases the finished electrodes exhibited electrical characteristics comparable to those of conventional water pasted silver oxide electrodes. The electrodes, according to the present invention, however, showed the advantage of not exhibiting the initial high voltage which is so characteristic for water pasted silver electrodes at low discharge rates. Another great advantage of the present invention lies, of course, in the elimination of the processes of sintering and pressing during manufacture.

We have found that for the purposes of the present invention the synthetic polymer should not be used in amounts greater than three quarters of 1% of the weight of the silver peroxide that makes up the active electrode material. In such small amounts the polymer remains in the electrode as dispersed powder without forming a continuous film that would increase the internal resistance of the cell. With less than 1% polymer the electrodes show great physical strength and sufficient permeability to the liquid electrolyte so that a large electrode area is exposed to it when the battery is in use.

It will be obvious to those skilled in the art that other synthetic high polymers than those mentioned in the specific examples may be used such as, for instance, methyl methacrylate, polyethylene, silicons, etc. Instead of grids made from nickel plated copper screens, other metals, such as nickel screens, silver plated nickel screens, silver plated copper screens or silver screens may be used. Similarly, other organic solvents than those mentioned may, of course, be used and the process may be varied within the scope of the invention as defined in the following claims:

What is claimed is:

1. The method of manufacturing porous, spongy silver peroxide electrodes to be used as positive electrodes in primary batteries comprising the steps of mixing finely ground silver monoxide powder with an anhydrous solution of a synthetic high polymer in an anhydrous volatile organic solvent to obtain an anhydrous paste, the synthetic high polymer being used in amounts of between .5 and 1 percent of the weight of the powdered silver monoxide, pasting said anhydrous paste into a supporting metal screen grid, allowing the organic volatile solvent to evaporate and then directly forming the dried plate in known manner to obtain a silver peroxide electrode.

2. The method of manufacturing silver peroxide electrodes according to claim 1 in which the synthetic high polymer comprises a member of the group consisting of polystyrene, methyl methacrylate and silicons.

3. The method of manufacturing silver peroxide electrodes according to claim 1 in which the silver monoxide powder is mixed with an anhydrous solution of polystyrene in toluene.

References Cited in the file of this patent

UNITED STATES PATENTS

| | | |
|---|---|---|
| 565,140 | Hubner | Aug. 4, 1896 |
| 2,636,916 | Licharz | Apr. 28, 1953 |
| 2,692,904 | Strauss | Oct. 26, 1954 |
| 2,694,743 | Ruskin | Nov. 16, 1954 |
| 2,737,541 | Coolidge | Mar. 6, 1956 |
| 2,738,375 | Schlotter | Mar. 13, 1956 |